United States Patent [19]

Hong

[11] Patent Number: 5,666,011
[45] Date of Patent: Sep. 9, 1997

[54] MINIATURE FAN MOTOR ASSEMBLY

[76] Inventor: Ching-Shen Hong, No. 3, Lane 45, Yi-Yung Road, Kaohsiung, Taiwan

[21] Appl. No.: 524,940

[22] Filed: Sep. 8, 1995

[51] Int. Cl.$^6$ .................................................. H02K 7/00
[52] U.S. Cl. ........................ 310/40.5; 310/254; 318/254
[58] Field of Search .......................... 310/40 R, 40.5, 310/254

[56] References Cited

U.S. PATENT DOCUMENTS 4,164,690  8/1979  Muller et al. ............................ 318/254
4,987,331  1/1991  Horng ..................................... 310/254
5,093,599  3/1992  Horng ..................................... 310/254

Primary Examiner—Steven L. Stephan
Assistant Examiner—Nicholas Ponomarenko
Attorney, Agent, or Firm—Bacon & Thomas

[57] ABSTRACT

A miniature fan motor assembly comprises a housing base provided with a base plate and a tubular post on the base plate for engaging a cylinder so as to support a rotor along its axis. The base plate combines with a circuit board on which a coil winding and a silicon steel sheet are secured to each other by an adhesive. The rotor is started by a magnetic field generated by a magnet and the coil winding.

2 Claims, 2 Drawing Sheets

MINIATURE FAN MOTOR ASSEMBLY

BACKGROUND OF THE INVENTION

1. Field of the Invention

The invention generally relates to a miniature fan motor assembly, and more particularly to a miniature fan motor in which a coil winding formed by winding enameled copper wires is adhered to a silicon steel sheet and then together secured to the surface of a circuit board, the alternating magnetic field generated by the coil winding interacting with the permanent magnet of a rotor such that a repulsion torque can be generated to drive the rotor.

2. Description of the Prior Art

In U.S. Pat. No. 4,987,331, entitled "Non-Brush D.C. Motor with an Improved Stator", and in U.S. Pat. No. 5,093,559, entitled "Non-Brush D.C. Motor with New Improved Stator", the base plate is wound with a winding, and upper and lower polar plates are respectively combined with the winding at two sides of the base plate, thereby forming their claimed stator structures.

The prior art techniques mentioned above disclose a stator structure comprising a winding in conjunction with polar plates, and even a winding base is used for securing the winding to the polar plates. However, the total thickness of a heat dissipating fan is not greatly reduced by these prior art techniques.

SUMMARY OF THE INVENTION

The main object of the invention is to provide a miniature fan motor assembly, which has a more compact and thin configuration.

DETAILED DESCRIPTION OF THE PREFERRED EMBODIMENTS

Figure 1:
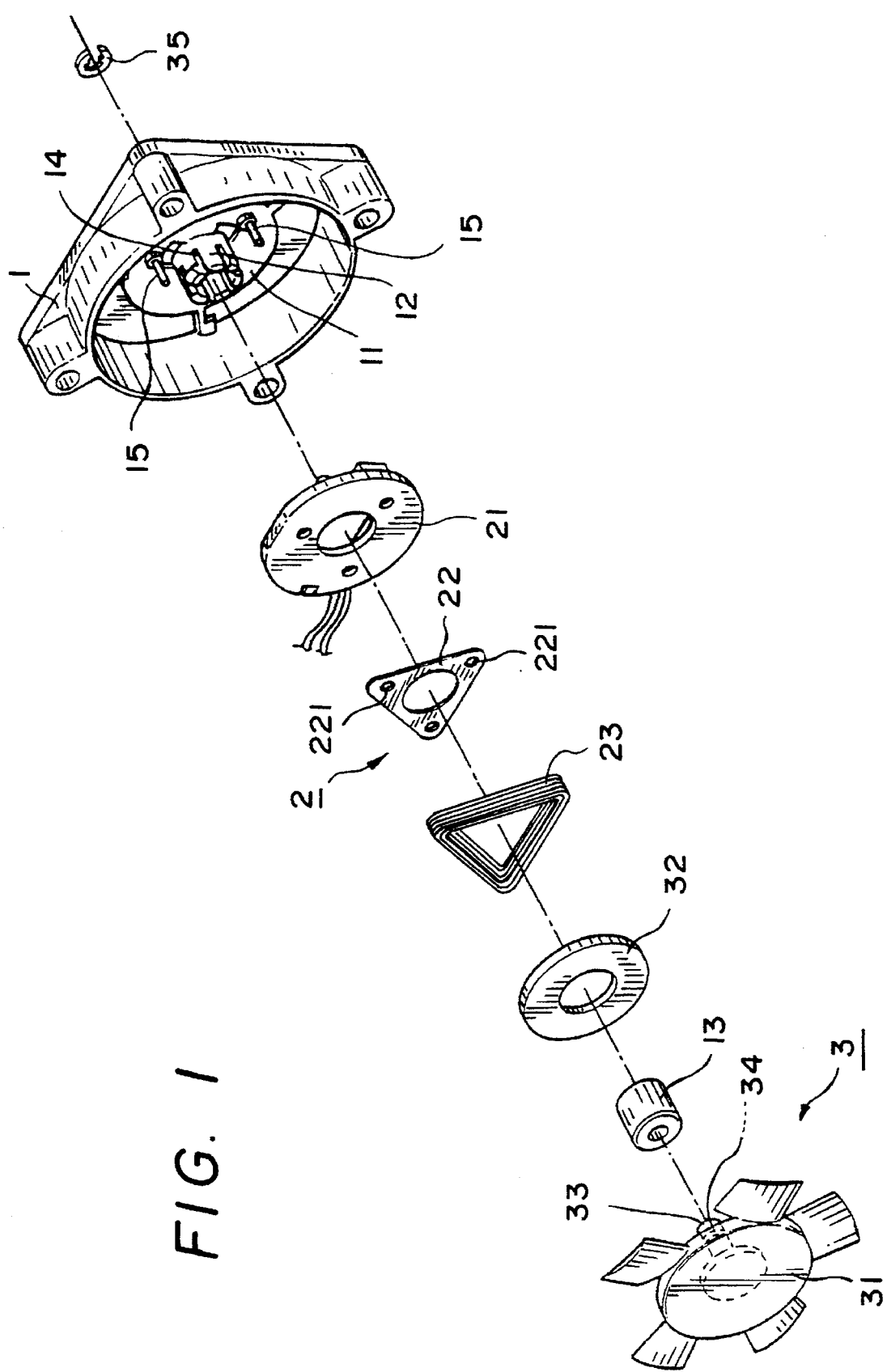
FIG. 1 is an exploded perspective of the fan motor in accordance with the invention.

Referring to FIG. 1, the invention mainly comprises a housing base 1, a stator 2 and a rotor 3. The housing base 1 is used to fix the stator, and, as illustrated, may take various shapes only if it is thin and capable of dissipating heat.

The housing is preferably made of plastic material. The housing base 1 is provided with a base plate 11 at the center of which a tubular post 12 is located. The tubular post 12 is to engage a cylinder 13, and may be provided with slots 14 for easier engagement with and better positioning of the cylinder 13 such that the tubular post 12 is more flexible in operation. In addition, the front ends of the pedal-shaped post 12 may take the form of protrusions having inwardly beveled faces for tightly fixing the cylinder 13 and for axial rotation of the cylinder 13. The base plate 11 is further provided with feet 15 perpendicular to the base plate for insertion of a circuit board 21 via holes.

The stator 2 comprises the circuit board 21, a silicon steel sheet 22 and a coil winding 23. The circuit board 21 includes IC components such as control components, and is electrically connected to enable the rotor operation. The silicon steel sheet 22 and the coil winding 23 are made into a thin sheet, and adhere to the circuit board 21 by adhesive or are engaged with the feet 15 of the base housing 1. When the circuit board 21 is connected to power, a magnetic field can be generated by the coil winding 23.

The rotor 3 comprises a fan with blades 31 and a magnet 32, in which the magnet 32 if fixed on the rear surfaces of the blades 31. A shaft post 33 is provided for insertion into the cylinder 13 and has a circular groove 34 for engaging with a fixing component 35 such as a C-shaped ring in order that the blades 31 can rotate with respect to the stator 2.

Figure 2:
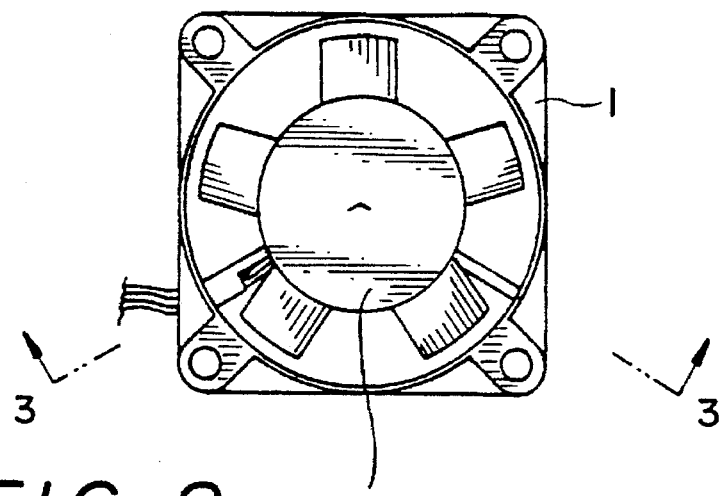
FIG. 2 is a top view of the fan motor when assembled in accordance with the invention.
Figure 3:
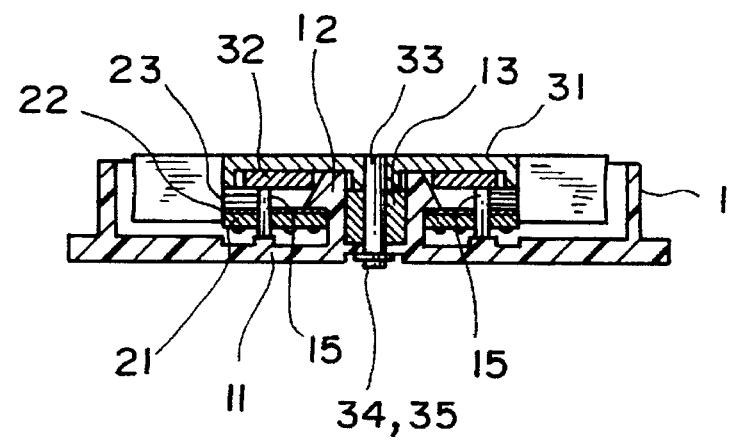
FIG. 3 is a cross-sectional view taken along line 3—3 of FIG. 2.
Figure 4:
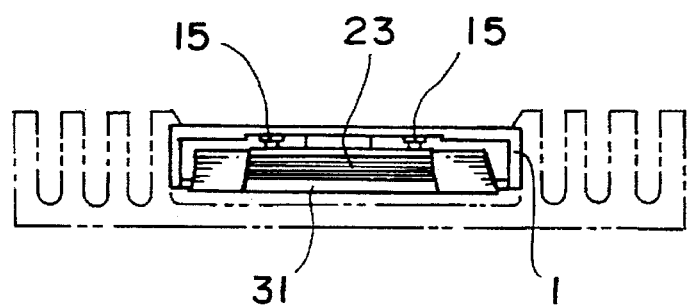
FIG. 4 is a cross-sectional view showing the invention mounted onto a heat sink.

FIGS. 2 and 3 show the invention when assembled. Since the invention is only suitable for use as a miniature fan, and the coil winding 23 and the magnet 32 in sheet form can create a magnetic fold, the blades 31 of the rotor 3 can be driven to rotate when the coil winding 23 is connected to power. Since the coil winding 23 and the silicon steel sheet 22 take a sheet form, and can create a magnetic field with the magnet 32, as compared with the conventional structures in which the coil windings and the magnets should be repeatedly mounted, the thickness and dimension of the assembly structure of the invention can be drastically reduced, and hence the total thickness of the invention is greatly reduced when mounted onto a heat sink (see FIG. 4). With a miniature fan motor, such reduction represents a significant improvement.

The invention is not limited to the embodiment described because many modifications and variations are possible within the scope of the invention for those skilled in the art.

I claim:

1. A miniature fan motor assembly comprising:

a housing base including a base plate, said base plate including a tubular post extending from a side thereof, said tubular post including a plurality of slots extending along a longitudinal direction thereof;

a cylinder mounted in the tubular post, said plurality of slots causing said tubular post to engage and position said cylinder;

a rotor comprising a fan and a shaft post, said fan being mounted on said shaft post, said shaft post being rotatably mounted in the cylinder;

a magnet securely mounted to the fan; and a stator comprising a circuit board securely mounted around the tubular post, a silicon steel plate and a coil winding together adhering to the circuit board, said silicon steel plate and said coil winding being in the form of a thin sheet, said coil winding generating a magnetic field interacting with said magnet to drive said rotor.

2. The miniature fan motor assembly according to claim 1, wherein said base plate includes at least one leg extending outwardly from said side, and said circuit board includes at least one hole defined therein through which said at least one leg extends.

* * * * *